United States Patent
Nagarajan et al.

(10) Patent No.: US 10,375,033 B2
(45) Date of Patent: Aug. 6, 2019

(54) METHOD AND APPARATUS FOR INSTANT PROCESSING OF A DOCUMENT WORKFLOW

(71) Applicant: Xerox Corporation, Norwalk, CT (US)

(72) Inventors: Ramesh Nagarajan, Pittsford, NY (US); Surya Prakash Kotha, Tamil Nadu (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/407,854

(22) Filed: Jan. 17, 2017

(65) Prior Publication Data
US 2018/0205838 A1  Jul. 19, 2018

(51) Int. Cl.
| | |
|---|---|
| G06F 3/12 | (2006.01) |
| H04L 29/06 | (2006.01) |
| G06F 16/27 | (2019.01) |
| G06F 21/62 | (2013.01) |
| H04L 29/08 | (2006.01) |
| H04L 12/26 | (2006.01) |

(52) U.S. Cl.
CPC .......... *H04L 63/0428* (2013.01); *G06F 16/27* (2019.01); *G06F 21/6218* (2013.01); *H04L 63/062* (2013.01); *H04L 43/0864* (2013.01); *H04L 43/0882* (2013.01); *H04L 67/1097* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 5,832,301 A | 11/1998 | Yamaguchi |
| 5,860,066 A | 1/1999 | Rouse |
| 5,969,826 A | 10/1999 | Dash et al. |
| 6,111,659 A | 8/2000 | Murata |
| 6,867,881 B1 | 3/2005 | Umezato |
| 7,844,749 B2 | 11/2010 | Tredoux et al. |
| 7,869,063 B2 | 1/2011 | Fukano |
| RE42,290 E | 4/2011 | Ogino |
| 7,933,035 B2 | 4/2011 | Okada et al. |
| 7,952,731 B2 | 5/2011 | Utsunomiya et al. |
| 7,969,593 B2 | 6/2011 | Toda |
| 8,115,949 B2 | 2/2012 | Toda |
| 8,115,959 B2 | 2/2012 | Yamada |

(Continued)

*Primary Examiner* — Henok Shiferaw
(74) *Attorney, Agent, or Firm* — Fox Rothschild LLP

(57) ABSTRACT

A system may automatically scan a physical document and perform processing actions on the scanned document according to a workflow. The system may include a scanning device that can detect a trigger event when a portable memory device is connected to or paired with the device or when a document, including one or multiple pages, is placed on the document handler of the device. Upon detecting the trigger event, the scanning device may retrieve the workflow and associated instructions from one or more designated folders on the portable memory device, automatically scan the document on the document handler to a digital document file, and perform various processing actions on the digital document file according to the workflow, with little or no user interaction. The processing actions may include storing, faxing, and emailing the scanned document, and/or performing certain document conversion functions on the digital document file.

26 Claims, 5 Drawing Sheets

(56) References Cited

U.S. PATENT DOCUMENTS

| | | |
|---|---|---|
| 8,441,666 B2 | 5/2013 | Tomii et al. |
| 8,599,395 B2 | 12/2013 | Sasakura |
| 8,817,319 B2 | 8/2014 | Martin |
| 8,947,683 B2 | 2/2015 | Tominaga |
| 9,009,359 B2 | 4/2015 | Ashok et al. |
| 9,185,245 B2 | 11/2015 | Miyachi et al. |
| 9,245,130 B2 | 1/2016 | Ashok et al. |
| 9,245,131 B2 | 1/2016 | Ashok et al. |
| 9,661,170 B2 | 5/2017 | Mitsuyama et al. |
| 9,674,383 B2 | 6/2017 | Suzuki |
| 9,727,288 B2 | 8/2017 | Kesavan et al. |
| 9,740,447 B1 | 8/2017 | Krishnasamy et al. |
| 9,800,752 B2 | 10/2017 | Hirasawa |
| 9,854,105 B1 | 12/2017 | Krishnasamy et al. |
| 2002/0093682 A1 | 7/2002 | Nakajima |
| 2003/0172117 A1 | 9/2003 | Henry |
| 2004/0170274 A1 | 9/2004 | Machida et al. |
| 2004/0220772 A1 | 11/2004 | Cobble et al. |
| 2005/0051942 A1 | 3/2005 | Kubo et al. |
| 2006/0132841 A1 | 6/2006 | Park et al. |
| 2006/0221372 A1 | 10/2006 | Onishi et al. |
| 2006/0265743 A1 | 11/2006 | Kusunoki et al. |
| 2006/0268310 A1 | 11/2006 | Tamai et al. |
| 2007/0109600 A1 | 5/2007 | Ren et al. |
| 2007/0229899 A1 | 10/2007 | Okuda |
| 2008/0040358 A1 | 2/2008 | Deng |
| 2008/0080001 A1 | 4/2008 | Yamada |
| 2008/0198412 A1* | 8/2008 | Yamada .............. H04N 1/00965 358/1.16 |
| 2008/0218795 A1 | 9/2008 | Kamasuka et al. |
| 2009/0125726 A1 | 5/2009 | Iyer et al. |
| 2009/0128862 A1* | 5/2009 | Nolepa .............. H04N 1/32042 358/402 |
| 2009/0135448 A1 | 5/2009 | Kawara |
| 2009/0204804 A1 | 8/2009 | Okubo |
| 2010/0074442 A1 | 3/2010 | Ohara |
| 2010/0188682 A1 | 7/2010 | Shirai |
| 2010/0231968 A1 | 9/2010 | Hirasawa et al. |
| 2010/0241868 A1 | 9/2010 | Nachef et al. |
| 2010/0268934 A1 | 10/2010 | Hinton et al. |
| 2011/0085205 A1* | 4/2011 | Ouchi .................. G06F 3/1221 358/1.15 |
| 2011/0090533 A1 | 4/2011 | Shimizu |
| 2011/0242580 A1 | 10/2011 | Tran |
| 2011/0292430 A1 | 12/2011 | Kang et al. |
| 2012/0050823 A1 | 3/2012 | Khawaja et al. |
| 2012/0069375 A1 | 3/2012 | Sasakura |
| 2012/0140266 A1 | 6/2012 | Takayama |
| 2012/0158956 A1 | 6/2012 | Sako |
| 2012/0194850 A1 | 8/2012 | K. et al. |
| 2012/0218605 A1 | 8/2012 | Yamada |
| 2012/0257232 A1 | 10/2012 | Koike |
| 2012/0307316 A1 | 12/2012 | De Muelenaere et al. |
| 2012/0327453 A1 | 12/2012 | Katahira |
| 2013/0077115 A1 | 3/2013 | Ozaki |
| 2013/0120799 A1 | 5/2013 | Maeda |
| 2016/0092146 A1 | 3/2016 | Adachi |
| 2016/0241736 A1* | 8/2016 | Saluja ................ H04N 1/32069 |
| 2016/0292548 A1 | 10/2016 | Nguyenvan |
| 2017/0139652 A1 | 5/2017 | Kesavan et al. |
| 2017/0177285 A1* | 6/2017 | Fujiwara ............... G06F 3/1215 |
| 2018/0095683 A1 | 4/2018 | Okada |
| 2018/0288272 A1 | 10/2018 | Yamamoto |

\* cited by examiner

METHOD AND APPARATUS FOR INSTANT PROCESSING OF A DOCUMENT WORKFLOW

BACKGROUND

This disclosure relates to scanning and processing a document and particularly to scanning and processing a document workflow instantly with little or no user activation of a local user interface (LUI).

In performing a conventional scanning job in a document system or a multi-function peripheral (MFP), such as scan-to-storage medium (e.g., hard drive or other memory), scan-to-email or scan-to-fax, a user normally needs to perform several steps. For example, in a normal scan job, the user needs to place the documents on the handler, use the LUI to enter the file directory in which the scanned document files will be stored, then push the "start" button to start the job. In a scan-to-email or scan-to-fax job, the user needs to place the documents on the handler, use the LUI to enter an email address or fax number of the recipient (or select from an address book), or customize the necessary options related to the transmission, and then push the "start" button to start the job. In a networked environment, a user may select to scan and email to him/herself. However, the user still needs to login to identify him/herself to the system and push the "start" button. Alternatively, templates can be created offline and uploaded onto the device. However, these various systems and methods for scanning and transmitting a document can still be cumbersome to users.

This document describes a system that may address at least some of the issues described above.

SUMMARY

In one embodiment, a multi-function print system for instant processing of a workflow includes a peripheral port, an image sensor and a processor that can be configured to detect a trigger event by detecting that a portable memory device is communicatively connected to the peripheral port. The system may also automatically retrieve a scan instruction containing at least one scan setting upon detecting the trigger event. Based on the retrieved scan instruction, the system may automatically cause the image sensor to scan a physical document and generate a digital document file corresponding to the scanned document. The system may further identify a first folder of a first designated name in the portable memory device, where the first designated name corresponds to a workflow. The system may extract the workflow from the first folder, and perform a processing action on the digital document file according to the workflow.

In some embodiments, the system may also include a document handler, and detecting the trigger event may also include detecting that the physical document is placed on the document handler. The portable memory device may include a file system having a second folder of a second designated name, in which the scan instruction is contained. Automatically retrieving the scan instruction may include, upon recognizing the second folder having the second designated name, extracting the scan instruction from the second folder.

In some embodiments, the workflow includes an email or a fax workflow. The processing action that the system performs on the digital document file may include identifying one or more email or fax addresses in the workflow, converting the digital document file to a transmittable digital document file of a format that is independent of the digital document file, and causing an email or fax application to transmit the transmittable digital document file to the one or more email/fax addresses.

In some embodiments, the processing action may include transmitting the digital document file to a cloud-based storage archive. The converting of the processing action may include converting the digital document file to the transmittable digital document file of a file type that is different from a file type of the digital document file, converting the digital document file to the transmittable digital document file that has a resolution different from a resolution of the digital document file, converting the digital document file to the transmittable digital document file that has a compression scheme different from a compression scheme of the digital document file, and/or converting the digital document file to the transmittable digital document file that has a color gamut different from a color gamut of the digital document file.

In some embodiments, upon detecting a trigger event, the system may detect whether a physical document is placed on a document handler of the multi-function print device. If a physical document is not placed on the document handler, the system may output a message via a user interface to prompt a user to load a physical document to the document handler. The system may also be configured to detect an additional physical document placed on the document handler, scan the additional physical document based on the retrieved scan instructions, and automatically perform additional processing action on the additional document according to the retrieved workflow.

DETAILED DESCRIPTION

Figure 1:
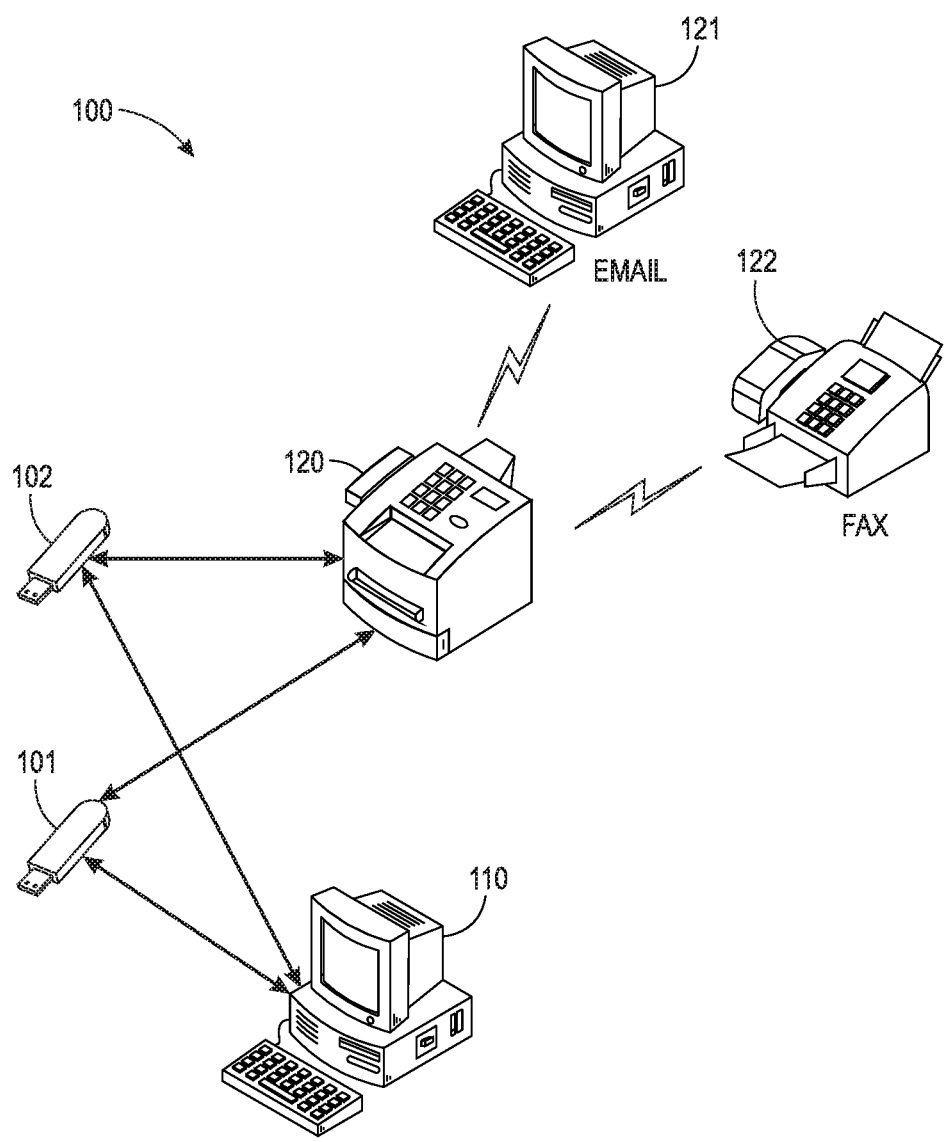
FIG. 1 illustrates a document system for instant scanning and processing of documents according to one embodiment.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

The term "local user interface" or "LUI" of a device refers to a user interface peripheral that is mounted to or built in an electronic device for users to perform various operations on the device. A local user interface typically includes a combination of hardware (such as a keyboard, keypad, touch-sensitive display and/or microphone) and software for presenting prompts to a user and receiving input from the user via the hardware.

The term "portable memory device" refers to a portable device that has non-transitory storage medium capable of storing data, such as a universal serial bus (USB) flash drive, a secure digital (SD) card or microSD card, a portable hard disk, a portable media player, a "smart" phone, or any other external storage device that has such storing capability. In various embodiments, the portable memory device does not need to include a processor. The portable memory device will typically have a file system. The portable memory device will include a data transfer device, such as a USB connector for a USB drive, input/output ports of an SD card or a radio unit (transceiver) of a near-field communication device such as a Bluetooth device.

A "computer" or "computing device" refers to a device that includes a processor and non-transitory, computer-readable memory. The memory may contain programming instructions that, when executed by the processor, cause the computing device to perform one or more operations according to the programming instructions. Examples of computing devices include personal computers, servers, mainframes, gaming systems, televisions, and portable electronic devices such as smartphones, smart watches, wearable electronic devices, digital cameras, fitness tracking devices, tablet computers, laptop computers, media players and the like.

The term "physical document" refers to a hard-copy document printed on a substrate and that can be scanned into a digital form. It may consist of a single sheet or a set of sheets or pages, which may include text, graphics, and/or images.

The term "digital document file," "document file," "electronic document" or "electronic document file" refers to a digital representation of a document such as a word processor file, a PDF file, or a bitmap file (e.g. TIFF, JPG, PNG files etc.) that is stored in a computer readable memory or a storage medium. A document file may be an electronic representation of a document that contains multiple pages.

The term "transmittable digital document file" or "transmittable document" refers to a digital representation of a document that can be transmitted to an external device over a communication network. Examples of transmittable digital document file include any digital document file that may be ready for transmitting to the communication network, or a digital document file that is of different format, resolution, compression rate, color or other settings from those of a source digital document and that is adapted to be suitable for transmitting to the network.

The term "document system" refers to a system of devices that communicate with each other for handling document related jobs, in particular, printing, copying, electronic storing, facsimile, transmitting or receiving (including fax, email, or communicating with a remote device), and/or image scanning of a physical document.

The term "scan" refers to a process that generates a digital image representation of a physical document, which may consist of one or multiple page images, and the generating process may be organized into a document processing job.

The term "scanning device" refers to a machine or device having hardware capable of scanning of a physical document and creating an electronic file containing a digital image of the document. Components of a scanning device typically include an image sensor (such as a CCD array or contact image sensor), a glass plate for receiving the document, a lamp, and a processing device. In some embodiments, a scanning device may have additional capabilities and may be, for example, a multifunction print device.

The term "workflow" refers to a plurality of services that are performable in a sequence. For example, in a print production environment, a workflow may include a sequence of services to be performed to process a print job. Such services may include, for example, printing, binding, collating, cutting and/or the like. The workflow may also include a sequence of services to be performed to scan a document into a digital document file and perform processing actions on the digital document file. The services may also include transmission of a digital document file, such as via email or fax.

The term "gamut" refers to a subset of colors which can be accurately represented in a particular medium. A digital document file or transmittable digital document file may contain a gamut that includes any subset of colors that can be handled by the device or application that handles the digital document file. For example, a transmittable digital document file that can be transmitted by email may have a full gamut, which is the same as the original gamut when the digital file was created. A transmittable digital document file to be transmitted by a conventional fax may have a gamut that contains only two colors (black and white) or a limited number of grey levels.

The embodiments described in this document provide instant scanning of physical documents and transmission of corresponding document files according to a workflow using a portable memory device in various document systems.

With reference to FIG. 1, a document system 100 may include a scanning device 120, a computer 110, an email server and/or terminal 121, a fax machine 122 and/or communication links. The scanning device 120 is capable of reading a portable memory device 101, 102 for instantly scanning a physical document and storing or transmitting the scanned document file. The portable memory device 101, 102 may store a workflow (e.g. an instruction file stored on a USB flash drive) for the scanning device to perform various operations. The portable memory device 101, 102 may also store scanning instructions or settings for scanning a physical document and/or other processing functions associated with performing various operations in the workflow. The scanning device 120 may extract the workflow from the portable memory device 101, 102 and perform various operations. The portable memory device 101, 102 may also be used to store document files that are generated by the scanning device 120.

In one embodiment, the scanning device 120 can detect a trigger event, e.g., a portable memory device is plugged into or otherwise communicatively connected to the scanning device, and a physical document is placed on the document handler of the scanning device 120. Then the scanning device may read the workflow or scan instructions from the portable memory device 101, 102 or the scanning device and instantly scan the placed document and perform a document processing action on the scanned document based on the instructions. In one embodiment, the scanning device may automatically scan the physical document to a digital document file and store the resulting digital document file onto the portable memory device in a designated folder. In another embodiment, the scanning device may automatically scan the physical document into a digital document file and perform a processing action on the digital document file according to the workflow. The processing action may include email or fax and/or necessary document processing functions to convert the digital document file to a transmittable digital document file and transmit the transmittable document via email 121 or fax 122 to a destination device. The address of the destination device for receiving the digital representation of the scanned document may be stored in the workflow or the instruction file.

Alternatively and/or additionally, the portable memory device 101, 102 may be pre-configured with default instructions by a computing device 110 via a web user interface (web-UI). Alternatively, the computing device 110 may be used to create the file system on the portable memory device.

Additionally, the user may plug the portable memory device in a computer and re-configure the instructions at any time.

Figure 2:
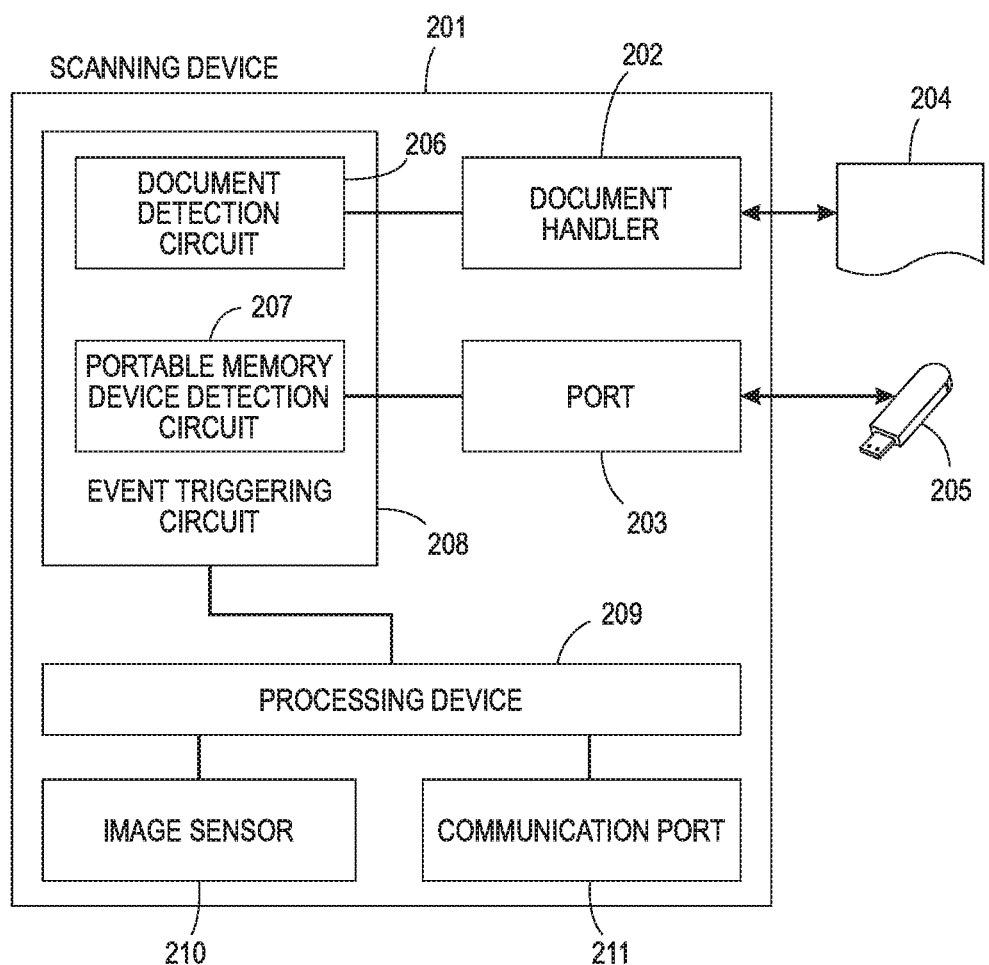
FIG. 2 illustrates a diagram of a scanning device according to one embodiment.

With reference to FIG. 2, various components in the document system are described in detail according to some embodiments. In one embodiment, the scanning device 201 may include a processing device 209 that is communicatively coupled to an image sensor 210 and a communicate port 211. The scanning device may also include a document handler 202, upon which a user can load one or more pages of a document 204. The scanning device will automatically scan the document pages placed on the document handler without user intervention. The scanning device may also include a port 203 for plugging in a portable memory device. Additionally, the scanning device may include an event triggering circuit 208 that triggers the scanning device to perform certain operations. The event triggering circuit may include a document detection circuit 206 that includes a circuit and a sensor that detects when a physical document is placed on the document handler. When the sensor detects that a physical document is placed on the document handler, the circuit may generate a trigger to the event trigger circuit, indicating that the document is ready to scan.

Alternatively and/or additionally, the event triggering circuit may include a portable memory device detection circuit 207 that may be communicatively coupled to the port 203. When a portable memory device 205 is plugged into the peripheral port 203, the portable memory device detection circuit may detect the status change of the port and subsequently generate a trigger to the event trigger circuit, indicating that user is initiating the scanning device and the workflow instructions for subsequent operations of the scanning device may be available to retrieve from the portable memory device. Alternatively, a portable memory device may be communicatively coupled to the communication port 211 of the scanning device, and the scanning device may be capable of pairing with a portable memory device wirelessly, such as via Wi-Fi, Bluetooth or other near-field communication protocols.

Figure 3:
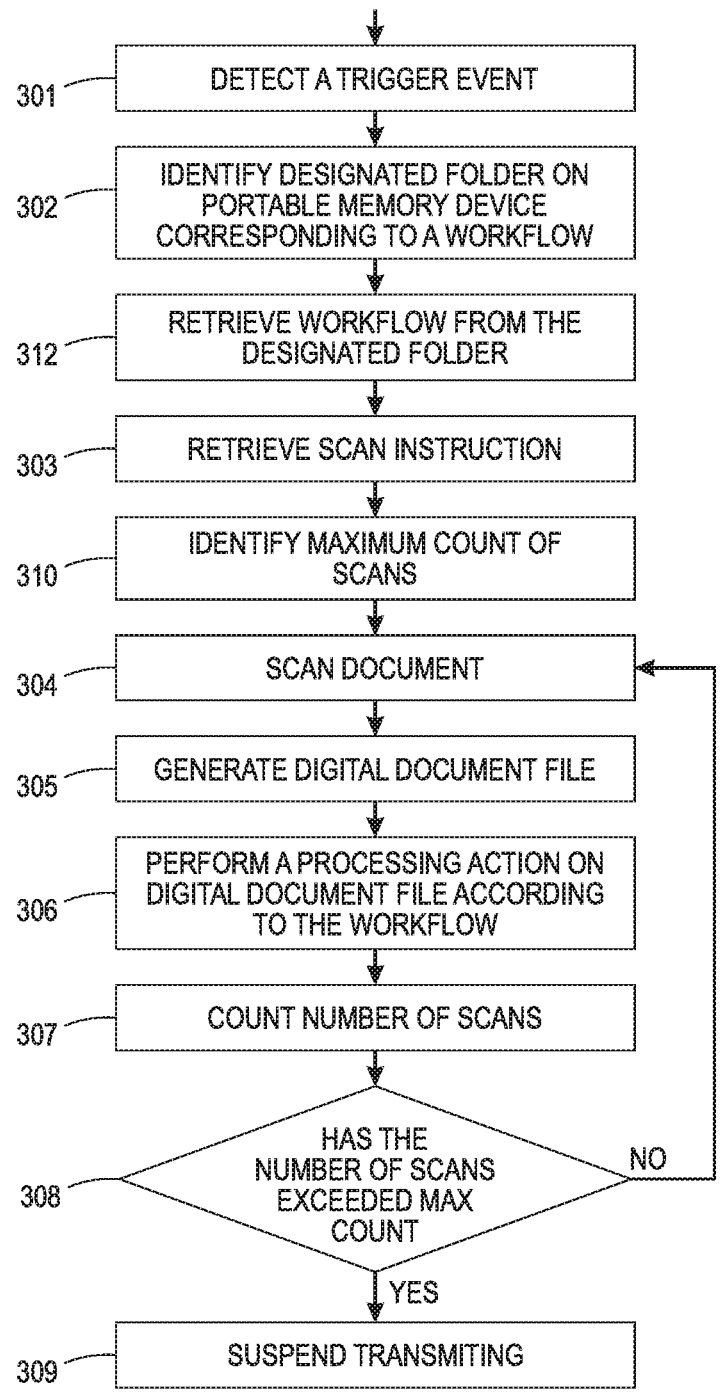
FIG. 3 is a diagram of instant scanning and processing documents according to one embodiment.

With reference to FIG. 3, methods for accomplishing various tasks in the illustrated system in FIG. 2 are provided. In one embodiment, a method for instant scanning of a document may include detecting a trigger event 301 that is indicative that the document is ready to scan. In one embodiment, detecting the trigger event may include receiving a trigger from the document detection circuit, indicating that a document is placed on the document handler. For example, the user has placed the first document on the document handler, where the first document may consist of single or multiple pages. In another embodiment, or additionally, detecting the trigger event may include receiving a trigger, indicating that a portable memory device is plugged into the port of or communicatively connected to the scanning device. In one example, the portable memory device is a USB flash drive, and detecting the trigger event may include receiving a trigger, indicating that a USB flash drive is plugged into the scanned device.

The scanning device of the system will include program instructions configured to automatically take certain actions in response to detecting the trigger event. As shown in FIG. 3, once the scanning device detects the trigger event, the scanning device may identify the designated folder corresponding to a workflow on the portable memory device 302, e.g. "\workflow," and extract the workflow from the designated folder 312. Alternatively and/or additionally, the designated folder may be a default folder or may be the root of the portable memory device file directory. Alternatively, and/or additionally, the portable memory device may store additional instructions or processing actions for specific services in the workflow. For example, the portable memory may store scan instructions, email instructions and fax instructions, etc. In one embodiment, the scan instructions may be stored in a designated folder on the portable memory, such as a sub-folder "\insta-scan" under the workflow folder, and upon recognizing the designated folder "\insta-scan," the scanning device may retrieve scan instructions from the designated folder 303.

In one embodiment, workflow and other instructions may be contained in an instruction file. For example, the scan instructions are contained in a scan instruction file, such as in the XML format, and the scanning device may parse the XML scan instruction file and extract relevant fields for scan instructions. The scan instructions may include various settings related to the scanning of the document (e.g. resolution, document/image mode, compression mode etc.) and other processing actions. The scanning device may include program instructions that can retrieve the workflow from a default file on the portable memory device (e.g. workflow.xml) or may use default workflow instructions stored in the scanning device. Alternatively and/or additionally, default scan instructions may be stored in a non-transitory memory built in the scanning device. Alternatively and/or additionally, the scanning device may obtain the location of scan instructions from the workflow and retrieve the scan instructions from the location.

In one embodiment, the scanning device may detect a trigger event by first detecting that a document is placed on the document handler. The scanning device may then assume that the portable device is connected or communicatively coupled to the scanning device, and then identify the designated folder on the portable device. If the portable memory device is not plugged in or paired with the scanning device, the scanning device may output a message to the user to prompt the user to connect the portable memory device, or it may wait for another command or action from the user. Alternatively, the scanning device may detect a trigger event by first detecting that a portable memory is connected to or paired with the scanning device. The scanning device may then check whether a document is loaded to the document handler. If no document is placed on the document handler, the scanning device may output a message to the user to prompt the user to load a document.

With further reference to FIG. 3, upon detecting the trigger event and retrieving the scan instructions, the scanning device may scan a document 304, which may consists of single or multiple pages, based on the scan instructions, generate a digital document file of the scanned document 305, such as a JPG, PDF, TIFF or any other document format, and perform a processing action on the digital document file according to the workflow 306. The processing action may be stored in the workflow and may include, for example, storing, emailing or faxing the digital document file of the scanned document. These processing actions may be based on instructions in the workflow. For example, storing the scanned document file may be based on the file naming convention that is included in the scan instructions, such as storing the document file with a filename prefix "Myscan."

The steps described above can repeat for scanning additional set of documents. Each additional set of documents may contain one or multiple pages. In one embodiment, upon user placing an additional set of documents on the document handler, the scanning device will detect that an additional document has been placed on the document handler, and then repeat the step of scanning the document 304, generating digital document file 305 and performing a processing action on the digital document 306. This process may repeat for an infinite number of documents until the user unplugs the portable memory device from the scanning device.

With further reference to FIG. 3, in one embodiment, the method may allow the system or user to limit the total number of scans. This maximum count of scans may be included in the scan instructions stored on the portable memory device or may be a default setting of the scanning device. In one embodiment, the scanning device may retrieve the scan instructions from the portable memory device and identify the max count of scans 310. Once a max count of scans is identified, each time the scanning device is repeating the scanning steps described above, the scanning device may additionally count the total number of scans 307 and check this number against the max count of scans 308. If the scanning device determines that the total number of scans has exceeded the max count of scans, the scanning device may suspend scanning 309 and stop scanning and processing additional documents; otherwise the scanning device may continue scanning and processing additional documents.

Using the methods described in FIG. 3, a user may accomplish scanning and processing multiple sets of documents in a workflow without the use of the LUI. For example, the user walks to the document system and plugs in the portable memory device, e.g. a USB drive, to the scanning device. The scanning device identifies the presence of the "\workflow" folder (or other designated folder) and retrieves the workflow and/or other associated instructions, such as scan, email or fax instructions. Alternatively, the user may pair a portable memory device capable of near-field communication (NFC) or other wireless communications with the scanning device. The user places the first set of originals (e.g. a 3-sheet document) on the document handler.

In a workflow, the scanning device may scan the first set of originals based on the scan instructions and, according to the workflow, store a digital document file (e.g. PDF) of the scanned originals onto the portable memory device in a designated folder (e.g. "\insta-scan"). Then the document is automatically removed from the document handler. The user may immediately place the next set of originals (e.g. a 5-sheet document) on the document handler, the scanning device detects that the second document is placed on the document handler and immediately scans and stores the digital document file for the second document. The user may place the third document (e.g. a 2-sheet document) on the document handler, and the scanning device will repeat the scanning and storing process. All these steps are performed automatically as part of the workflow without the use of the LUI.

Alternatively and/or additionally, the system may allow a user to pre-configure to store the digital document files in one-file-per-page in the scan instructions. This will allow the user to perform more flexible and efficient scanning. For example, if the user wants to scan 10 one-page documents, instead of scanning the documents in 10 repeats as described above, the user may include a one-file-per-page option and a prefix for the file name in the scan instructions. Then, the user may stack the 10 one-page documents and place them on the document handler, and the scanning device may scan all of the 10 one-page documents once and save to 10 separate document files using the pre-configured prefix name, without performing the steps of "placing document" and "scanning" repeatedly.

With further reference to FIG. 3, when the system is capable of suspending a scanning job after the total number of scans has exceeded the max count, the scanning device will still allow the user to perform other additional document related processing actions immediately following the scan job. For example, the scanning device may allow the user to first scan and store three documents to the portable memory device, then fax/email additional documents without the need to unplug and plug the portable memory device from/in the scanning device, which will be described in this document.

Figure 4:
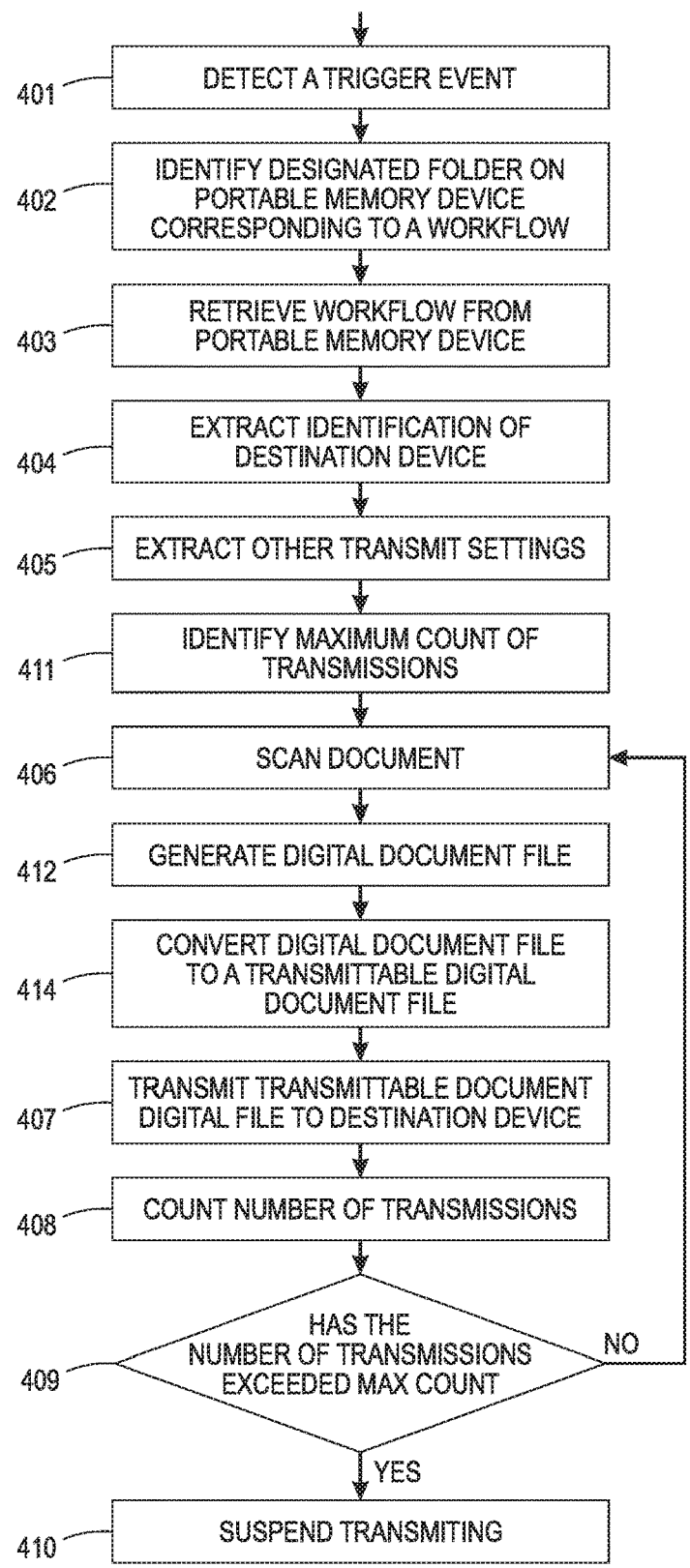
FIG. 4 is a diagram of instant scanning and transmitting documents according to one embodiment.
Figure 5:
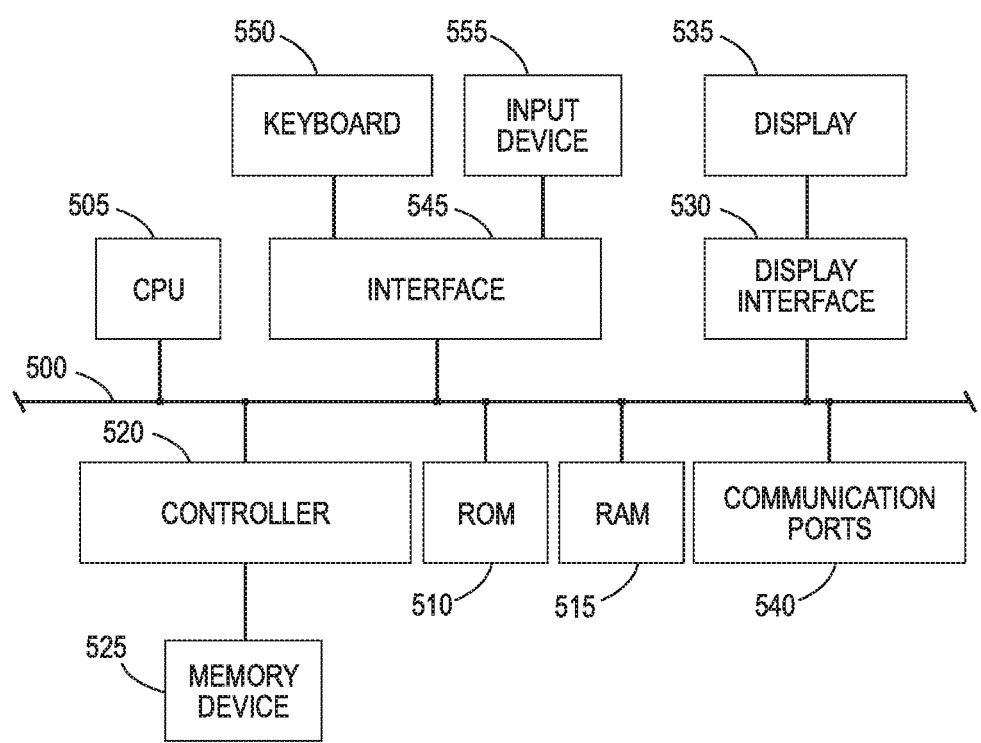
FIG. 5 is a block diagram of elements of a computing device on which the various systems and methods in this document could be implemented.

Returning to FIG. 2, the embodiments described in FIG. 2 may also be configured to automatically scan and perform other additional processing actions, such as to transmit, e.g. email or fax, a digital representation of a document to a destination device, via the communication port 211. With reference to FIG. 4, a method for instant transmission of a document may include detecting a trigger event 401 that is indicative that the document is placed on the document handler or the portable memory device is plugged in the scanning device. In one embodiment, detecting the trigger event may include detecting that a document is placed on the document handler. In another embodiment, or additionally, detecting the trigger event may include detecting that a portable memory device is plugged into the port of the scanning device. For example, the user has plugged a USB flash drive into the scanning device. The USB flash drive may have a designated folder for storing various instructions associated with the workflow. For example, the "\insta-email" folder may store email instructions and the "\insta-fax" folder may store fax instructions.

In one embodiment, an instruction file may be stored in the portable memory device in the designated folder for email, such as "\insta-email." The instruction file may contain details required for emailing one or more documents, and at least an address of a destination device, such as an email address of the recipient. For example, the instructions may include "To," such as john.doe1 @abc.com; john.doe2@abc.com; john.doe3@abc.com (multiple recipients' names are separated by ";"). Additionally, the instruction file may contain additional transmission settings related to email transmission, each setting may contain multiple items separated by a delimiter such as semi-column. For example, the instruction file may contain "CC" (e.g. john.doe4@abc.com; john.doe5@abc.com; john.doe6@abc.com), "BCC," "From" (e.g. joh.doe@xerox.com), "Subject" (e.g. "Scanned from Xerox MFD"), and "Body" (i.e. an automated message to be included in the email, such as "This email is generated by a workflow on a multi-function peripheral"). Some of the above settings such as "To" may be required, whereas some settings may be optional. The scanning device may store default values for optional settings. When an instruction file also contains optional settings, the system may override the default settings with the values stored in the instruction file.

Alternatively and/or additionally, an instruction file for fax may be stored in the portable memory device in a designated folder, such as "\insta-fax," and the instruction file may include details required for fax, and at least an address of the destination device such as a fax number of the recipient. Additionally, the instruction file may include multiple fax numbers for multiple recipients, with multiple fax numbers being separated by delimiters such as "," or ";" or other characters. The fax number that is included in the instruction file may also contain area code, country code or a phone number in any format. Alternatively and/or additionally, the instructions for fax may also contain other settings such as the recipient name, the cover page, the note on the cover page, the fax resolution, the total fax page number, the fax mode (e.g. picture/document mode), the fax protocol (e.g. fax protocols supported by PSTN or fax over IP protocols such as T.38) and/or fax compression types, such as CCITT Group 4.

Additionally, on the portable memory device, the workflow folder or any designated folders for instructions associated with the workflow may contain instructions for an processing action that can be performed over a digital document file corresponding to a scanned document. The instructions may contain computer scripts or programming instructions, such as C, python, R or C++ that are retrievable and usable by the scanning device to perform the processing action. For example, the processing action may be an image scaling that is to be applied to a digital document to be emailed or faxed, so that the scaled document will be at a reduced size or resolution, such as VGA size or a resolution of 100 dots per inch (DPI). This reduced resolution would allow efficient use of the communication network.

In another example, the processing action may be converting the digital document file corresponding to the scanned document to a transmittable digital document file in a fax format that is independent of the format of the digital document file. For example, the independent format can be a device dependent or application dependent file format that will be usable by the scanning device or fax application to fax a document.

In another example, the action may be converting compression types suitable for a facsimile channel. In one embodiment, the scanning device may retrieve fax instructions that includes the required compression types for fax transmission. The scanning device may use a default built-in compression algorithm to generate the transmittable digital document file in one of the required compression types. In another embodiment, the fax instructions stored on the portable memory device may additionally contain programming instructions for implementing a custom compression type algorithm. The scanning device may retrieve the programming instructions for converting the compression type and execute them to generate a transmittable digital document file for fax transmission. In another example, the action may be converting the gamut of the digital document file to a gamut suitable for facsimile, such as 16 grey scale or binary black and white.

With further reference to FIG. 4, once the scanning device detects the trigger event 401, the scanning device may identify the designated folder on the portable memory device by its name 402, e.g. "\workflow" or other sub-folders for instructions, or instruction files, associated with the workflow, such as "\insta-scan" and "\insta-fax," and retrieve workflow and/or instructions from the designated folder 403. Similar to embodiments described in FIG. 3, the scanning device may detect the trigger event by first detecting that a document is placed on the document handler. If the portable memory device is not plugged in or paired with the scanning device, the scanning device may output a message to the user to prompt the user to connect the portable memory device. Alternatively, the scanning device may detect a trigger event by first detecting that a portable memory is connected to or paired with the scanning device. The scanning device may then check whether a document is loaded to the document handler. If no document is placed on the document handler, the scanning device may output a message to the user to prompt the user to load a document.

With further reference to FIG. 4, the scanning device will then extract from the instruction file the address of the destination device 404, such as an email address or a fax number. Additionally, the scanning device may also extract other transmit settings related to the transmission of documents from the instruction file 405, such as "From," "CC," "Subject" etc. for email transmission or settings related to fax transmission, such as the recipient name, the cover page, the note to be included in the fax, the fax resolution, the compression type, and/or the total fax page number. The instruction file may be stored as a "txt" or CSV (comma separated values) or spread sheet file such as a Microsoft Excel file, with details required for each type of transmission. Alternatively, the instruction file may also be stored as an XML file.

With further reference to FIG. 4, upon detecting the trigger event and retrieving the transmission settings, the scanning device may scan a document 406, which may consist of a single or multiple pages. Based on the transmission settings, the scanning device may generate a digital document file 412 corresponding to the scanned document. The transmission settings or instructions may also require converting to a transmittable digital document file suitable for a particular transmission means, such as email or fax. In one embodiment, the scanning device may retrieve the transmission instructions and convert the digital document file to a transmittable digital document file 414 according to the transmission instructions.

In FIG. 4, the scanning device may further transmit the transmittable digital document file to the destination device 407 at the extracted email address or fax number. The scanning device may also include additional program instructions that will parse an address that has multiple entries, such as multiple email addresses or multiple fax numbers delimited by a special character (e.g. a comma, tab, semi-column, or a space), then automatically transmit the digital representation of the scanned document to multiple recipients.

The steps described above can repeat for transmitting additional sets of documents, while each set of documents may contain single or multiple pages. In one embodiment, upon a user placing an additional set of documents on the document handler, the scanning device will detect that an additional document has been placed on the document handler, and then repeat the steps 406, 412, 414, 407 from scanning the document to transmitting the digital representation of the scanned document to the same destination device. For example, the scanning device is scanning and emailing the first set of originals to a destination email address. Upon the user placing an additional set of originals, the scanning device may scan the additional set of originals and transmit the digital representation of the scanned document to the same destination email address.

The scanning device may repeat the same process for any number of additional documents, or until the user unplugs the portable memory device from the scanning device. Alternatively and/or additionally, the scanning device may repeat the scanning and transmitting steps in the same manner for fax operations, i.e. allow the user to place an additional set of documents upon completion of each fax and the scanning device will scan and fax the additional set of documents to the same destination fax number.

With further reference to FIG. 4, additionally, the method may allow the system or user to limit the total number of transmissions. This max count may be defined in the transmit settings that are stored on the portable memory device or may be stored as a default setting in the scanning device. In one embodiment, the scanning device may retrieve the transmission settings from the portable memory device and identify the max count of transmissions 411. Once a max count of transmissions is identified, each time the scanning device is repeating the transmission steps described above, the scanning device may additionally count the total number of transmissions 408 and check this number against the max count of transmissions 409. If the scanning device determines that the total number of transmissions has exceeded the max count of transmissions, the scanning device may suspend the transmission 410 (e.g. email or fax) and switch to perform other additional processing actions; otherwise, the scanning device may continue scanning and transmitting additional sets of documents.

Alternatively, and/or additionally, when multiple designated folders exist on the portable memory device, the scanning device may provide the user with a simple interface to select which operation of the workflow the user wants to perform at this time. For example, when both "\insta-email" and "\insta-fax" folders co-exist, the scanning device may simple prompt the user to select email or fax on the LUI. When the scanning device receives user's selection on which operation to perform, the scanning device may proceed with retrieving scan instructions for the selected operation from the corresponding designated folder and perform the selected operation without further interaction from the user, as described in various embodiments in FIGS. 3 and 4.

In some embodiments, a portable memory device that may be communicatively connectable to a scanning device for performing a workflow in a document system may include a a non-transitory computer-readable medium containing a file system. The file system may include a folder of a designated name corresponding to a workflow such as "\workflow," or a default folder for storing a workflow and associated instructions for performing one or more processing actions. The folder of the designated name may be configured so that the workflow is identifiable and retrievable by a scanning device when the portable memory device is communicatively connected to the scanning device and detected by the scanning device. The associated instructions may include a scan instruction, for example, in the form of an instruction file on the portable memory device. The scan instruction may be contained in the designated folder corresponding to the workflow, or in another designated folder corresponding to scanning, so that the scan instruction is also identifiable and retrievable by the scanning device when the portable memory device is communicatively connected to and detected by the scanning device.

In one embodiment, upon the portable memory device being communicatively connected to and detected by a scanning device, the scan instruction on the portable memory device will be identified and retrieved by the scanning device. The scan instruction, when uploaded to the scanning device, will cause an image sensor of the scanning device to scan a physical document and generate a digital document file corresponding to the scanned document based on the scan instruction. Upon the portable memory device being communicatively connected to and detected by the scanning device, the workflow on the portable memory device will also be identified and retrieved by the scanning device, and will subsequently cause the scanning device to perform one or more processing actions on the digital document file.

In one embodiment, the folder corresponding to the workflow will also include an email workflow containing one or more email addresses and email instructions so that, when identified and retrieved by the scanning device, will cause the scanning device identify the one or more email addresses in the workflow, and convert the digital document file to a transmittable digital document file of a format that is independent of the digital document file. The email instructions will further cause the scanning device to transmit the transmittable digital document file to the one or more email addresses.

Alternatively, and/or additionally, the folder corresponding to the workflow will also include a fax workflow containing one or more fax numbers and fax instructions so that, when identified and retrieved by the scanning device, will cause the scanning device to convert the digital document file to a transmittable digital document file and transmit the transmittable digital document file to the one or more fax numbers. As described earlier in this document, the work flow on the portable memory device may include various processing instructions to convert the digital document file to the transmittable digital document file.

Alternatively, and/or additionally, workflow on the portable memory device may include additional instructions to allow a user to perform a workflow with different transmission types or scanning operations without requiring the user to unplug and plug the portable memory device. For example, in one embodiment, the scan instructions include the maximum count of scans. Upon reaching the maximum count of scans, the scanning device will switch to other operations, such as email or fax, without requiring user to unplug the portable memory device.

In various embodiments, the portable memory device may allow various ways, such as via a document system (e.g. a scanning device or a multi-function peripheral device), or via any stand-alone device (e.g. a personal computer), to pre-configure the various workflow and associated instructions on the portable memory device. For example, the workflow folder may be pre-configured to include multiple folders for different processing actions, or different folders for a certain type of processing action. For example, the portable memory device may have both "\insta-email" and "\insta-fax" for storing and emailing/faxing documents. In another example, the portable memory device may have "\insta-scan1" and "\insta-scan2," each for storing different scan instructions for scanning and storing scanned documents to the portable memory device.

In one embodiment, to pre-configure a workflow or associated instructions on the portable memory device, the portable memory device may be pluggable to a user's own desktop (e.g. 110 in FIG. 1) to allow the user to pre-configure the workflow and/or other associated instructions through a web-UI. In a networked document system, if an application is available for user to modify network and system settings of the system from a user's computer, each user can also use the application to frequently change the default settings. For example, in a document system, each user may be given a separate "workflow" page to pre-configure or modify the default settings for workflow so that, when the portable memory device is communicatively connected to the document system, it will cause the document system to activate the user's "workflow" page to allow the user to pre-configure the workflow on the portable memory device. Similarly, each user may also be given an "insta-scan" page to pre-configure or modify the default settings for scanning documents. This can be a one-time activity or the user can change it any time.

In some embodiments, similar to scanning, pre-configuration of transmission settings may be accomplished by allowing a user to plug in the portable memory device on the user's own computer (110 in FIG. 1) and pre-configure the transmission settings on the portable memory device through a web-UI. In a networked document system, if an application is available for user to modify network and system settings on the system from a user's computer, each user can also use the application to frequently change the default settings. For example, each user may be given a separate "insta-email" and/or "insta-fax" page to pre-configure or modify the default settings. This can be a one-time activity or the user can change it any time. Alternatively and/or additionally, the system may enhance the security of transmission operations by requiring user to enter password at some point, such as before or after scanning the documents to be transmitted. This option of requiring password may be included in the scan instructions stored either on the portable memory device or in the scanning device.

FIG. 7 depicts an example of internal hardware that may be included in any of the electronic components of the system, the scanning device or another device in the system such as the system 110, 120 (in FIG. 1). An electrical bus 500 serves as an information highway interconnecting the other illustrated components of the hardware. Processor 505 is a central processing device of the device, configured to perform calculations and logic operations required to execute programming instructions. As used in this document and in the claims, the terms "processor" and "processing device" may refer to a single processor or any number of processors or processor cores in one or more processors. The device may include read only memory (ROM) 510, random access memory (RAM) 515. Other types of memory devices, such as flash memory, hard drives and other devices capable of storing electronic data constitute examples of memory devices 510. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication ports or devices 540 such as a portable memory device reader/writer, a transmitter and/or receiver, an antenna, an RFID tag and/or short-range or near-field communication circuitry. The communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device (camera) and/or an audio input device (microphone). Various methods of activation, validation and/or authorization described in this document may be performed by the central processing device 505 or a controller 520.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

The invention claimed is:

1. A multi-function print device for instant processing of a workflow, comprising:
    a peripheral port;
    an image sensor;
    a processor communicatively coupled to the peripheral port and the image sensor; and
    a non-transitory computer-readable storage medium containing program instructions that are configured to, when executed, cause the processor to:
        detect a trigger event, wherein detecting the trigger event comprises detecting that a portable memory device is communicatively connected to the peripheral port,
        upon detecting the trigger event, automatically retrieve a scan instruction comprising at least one scan setting,
        automatically cause the image sensor to scan a physical document and generate a digital document file corresponding to the scanned document based on the retrieved scan instruction and without user intervention,
        identify a first folder of a first designated name in the portable memory device, wherein the first designated name corresponds to a workflow,
        extract the workflow from the first folder, and
        perform a processing action on the digital document file according to the workflow.

2. The multi-function print device of claim 1 further comprising a document handler, wherein:
    detecting the trigger event also comprises detecting that the physical document is placed on the document handler.

3. The multi-function print device of claim 1, wherein:
    the portable memory device includes a file system having a second folder of a second designated name, in which the scan instruction is contained; and
    the program instructions to automatically retrieve the scan instruction comprise instructions to, upon recognizing the second folder having the second designated name, extract the scan instruction from the second folder.

4. The multi-function print device of claim 1, wherein:
    the workflow comprises an email workflow; and
    the processing action comprises:
        identifying one or more email addresses in the workflow,
        converting the digital document file to a transmittable digital document file of a format that is independent of the digital document file, and
        causing an email application to transmit the transmittable digital document file to the one or more email addresses.

5. The multi-function print device of claim 4, wherein the converting of the processing action comprises:
    converting the digital document file to the transmittable digital document file of a file type that is different from a file type of the digital document file; or
    converting the digital document file to the transmittable digital document file that has a resolution different from a resolution of the digital document file; or
    converting the digital document file to the transmittable digital document file that has a compression scheme different from a compression scheme of the digital document file; or
    converting the digital document file to the transmittable digital document file that has a color gamut different from a color gamut of the digital document file.

6. The multi-function print device of claim 1, wherein:
    the workflow comprises a fax workflow; and
    the processing action comprises:
        identifying one or more fax numbers in the workflow, converting the digital document file to a transmittable digital document file of a format that is independent of the digital document file, and causing a communication interface of the multi-function print device to transmit the transmittable digital document file to the one or more fax numbers.

7. The multi-function print device of claim 6, wherein the converting of the processing action comprises:
converting the digital document file to the transmittable digital document file of a fax format that is different from a format of the digital document file;
converting the digital document file to the transmittable digital document file that has a resolution different from a resolution of the digital document file;
converting the digital document file to the transmittable digital document file that has a compression scheme different from a compression scheme of the digital document file; or
converting the digital document file to the transmittable digital document file that has a color gamut different from a color gamut of the digital document file.

8. The multi-function print device of claim 2, wherein the program instructions are further configured to cause the processor to:
upon detecting that the trigger event has occurred, detect whether a physical document is placed on a document handler of the multi-function print device; and
if a physical document is not placed on the document handler, output a message via a user interface to prompt a user to load a physical document to the document handler.

9. The multi-function print device of claim 2, wherein the computer-readable storage medium comprises additional program instructions that will cause the processor to:
upon performing the processing action on the digital document file for the scanned document, detect an additional trigger event, wherein detecting the additional trigger event comprises detecting that an additional physical document is placed on the document handler;
automatically cause the image sensor to scan the additional physical document and generate an additional digital document file for the additional physical document based on the retrieved scan instruction; and
automatically perform additional processing action on the additional digital document file according to the retrieved workflow.

10. The multi-function print device of claim 1, wherein the programming instructions on the computer-readable storage medium to perform the processing action comprise programming instructions to:
retrieve, from the portable memory device, additional programming instructions that, when executed, will cause the processor to convert the digital document file to a transmittable digital document file of a format that is independent of the digital document file.

11. A method for automatically processing a workflow in a multi-function print device, comprising:
by a processing device, detecting a trigger event by detecting that a portable memory device is communicatively connected to a peripheral port of a multi-function print device;
upon detecting the trigger event, automatically retrieving, by the processing device, a scan instruction comprising at least one scan setting;
automatically causing, by the processing device, an image sensor of the multi-function print device to scan a physical document and generate a digital document file corresponding to the scanned document based on the retrieved scan instruction and without user intervention;
identifying, by the processing device, a first folder of a first designated name in the portable memory device, wherein the first designated name corresponds to a workflow;
extracting, by the processing device, the workflow from the first folder; and
performing, by the processing device, a processing action on the digital document file according to the workflow.

12. The method of claim 11, wherein detecting the trigger event also comprises detecting that the physical document is placed on a document handler of the multi-function print device.

13. The method of claim 11, further comprising:
recognizing, by the processing device, a second folder of a second designated name in the portable memory device;
wherein retrieving the scan instruction comprises, upon recognizing the second folder have the second designated name, extracting the scan instruction from the second folder.

14. The method of claim 11, wherein:
the workflow comprises an email workflow; and
the processing action comprises:
identifying one or more email addresses in the workflow,
converting the digital document file to a transmittable digital document file of a format that is independent of the digital document file, and
causing an email application to transmit the transmittable digital document file to the one or more email addresses.

15. The method of claim 14, wherein converting the digital document file comprises:
converting the digital document file to the transmittable digital document file of a file type that is different from a file type of the digital document file; or
converting the digital document file to the transmittable digital document file that has a resolution different from a resolution of the digital document file; or
converting the digital document file to the transmittable digital document file that has a compression scheme different from a compression scheme of the digital document file; or
converting the digital document file to the transmittable digital document file that has a color gamut different from a color gamut of the digital document file.

16. The method of claim 11, wherein:
the workflow comprises a fax workflow; and
the processing action comprises:
identifying one or more fax numbers in the workflow,
converting the digital document file to a transmittable digital document file of a format that is independent of the digital document file, and
causing a communication interface of the multi-function print device to transmit the transmittable digital document file to the one or more fax numbers.

17. The method of claim 16, wherein converting the digital document file comprises:
converting the digital document file to the transmittable digital document file of a fax format that is different from a format of the digital document file;

converting the digital document file to the transmittable digital document file that has a resolution different from a resolution of the digital document file;

converting the digital document file to the transmittable digital document file that has a compression scheme different from a compression scheme of the digital document file; or converting the digital document file to the transmittable digital document file that has a color gamut different from a color gamut of the digital document file.

18. The method of claim 12, wherein:

upon detecting that the trigger event has occurred, detecting, by the processing device, whether a physical document is placed on the document handler of the multi-function print device; and if a physical document is not placed on the document handler, outputting, by the processing device, a message via a user interface to prompt a user to load a physical document to the document handler.

19. The method of claim 12, further comprising:

upon performing the processing action on the digital document file for the scanned document, detecting an additional trigger event, by detecting that an additional physical document is placed on the document handler;

automatically causing the image sensor to scan the additional physical document and generate an additional digital document file for the additional physical document based on the retrieved scan instruction; and automatically performing the additional processing action on the additional digital document according to the retrieved workflow.

20. The method of claim 11, wherein performing the processing the processing action comprises:

retrieving, from the portable memory device, programming instructions and executing the retrieved programming instructions to convert the digital document file to a transmittable digital document file of a format that is independent of the digital document file.

21. A portable memory device, comprising:

a non-transitory computer-readable medium containing a file system that contains:

a first folder of a first designated name corresponding to a workflow configured to be identifiable and retrievable by a scanning device when the portable memory device is communicatively connected to scanning device and detected by the scanning device; and a second folder containing a scan instruction and configured to be identifiable and retrievable by the scanning device so that, when retrieved by the scanning device, the scan instruction will cause the scanning device to cause an image sensor to scan a physical document and generate a digital document file corresponding to the scanned document;

wherein the first folder comprises processing instructions that, when retrieved by the scanning device, will cause the scanning device to perform a processing action on the digital document file according to the workflow without user intervention.

22. The portable memory device of claim 21, wherein:

the first folder also comprises an email workflow containing one or more email addresses therein; and the processing instructions further comprise instructions that, when retrieved by the scanning device, will cause the scanning device to:

identify the one or more email addresses in the workflow, convert the digital document file to a transmittable digital document file of a format that is independent of the digital document file, and cause an email application to transmit the transmittable digital document file to the one or more email addresses.

23. The portable memory device of claim 22, wherein the processing instructions further comprise instructions that, when retrieved by the scanning device, will cause the scanning device to:

convert the digital document file to the transmittable digital document file of a file type that is different from a file type of the digital document file; or convert the digital document file to the transmittable digital document file that has a resolution different from a resolution of the digital document file; or convert the digital document file to the transmittable digital document file that has a compression scheme different from a compression scheme of the digital document file; or convert the digital document file to the transmittable digital document file that has a color gamut different from a color gamut of the digital document file.

24. The portable memory device of claim 21, wherein:

the first folder also comprises a fax workflow containing one or more fax numbers therein; and the processing instructions further comprise instructions that, when retrieved by the scanning device, will cause the scanning device to:

identify the one or more fax numbers in the workflow, convert the digital document file to a transmittable digital document file of a format that is independent of the digital document file, and cause a communication interface of the scanning device to transmit the transmittable digital document file to the one or more fax numbers.

25. The portable memory device of claim 24, wherein the processing instructions further comprise instructions that, when retrieved by the scanning device, will cause the scanning device to:

convert the digital document file to the transmittable digital document file of a fax format that is different from a format of the digital document file; or convert the digital document file to the transmittable digital document file that has a resolution different from a resolution of the digital document file; or convert the digital document file to the transmittable digital document file that has a compression scheme different from a compression scheme of the digital document file; or convert the digital document file to the transmittable digital document file that has a color gamut different from a color gamut of the digital document file.

26. The portable memory device of claim 21, wherein the processing instructions also include programming instructions that, when executed by the scanning device, will cause the scanning device to convert the digital document file to a transmittable digital document file of a format that is independent of the digital document file.

* * * * *